(12) United States Patent
Suzuki

(10) Patent No.: US 6,697,127 B2
(45) Date of Patent: Feb. 24, 2004

(54) GAMMA CORRECTION CIRCUIT

(75) Inventor: Yoshiteru Suzuki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 471 days.

(21) Appl. No.: 09/843,874

(22) Filed: Apr. 30, 2001

(65) Prior Publication Data

US 2002/0057374 A1 May 16, 2002

(30) Foreign Application Priority Data

Nov. 10, 2000 (JP) ........................................ 2000-343537

(51) Int. Cl.[7] ............................ H04N 9/69; H04N 5/202
(52) U.S. Cl. ........................................ 348/674; 348/675
(58) Field of Search ................................. 398/254–256, 398/674–677; 345/589, 591, 600–602; 358/3.23, 519; H04N 9/69, 5/202

(56) References Cited

U.S. PATENT DOCUMENTS

| | | | | |
|---|---|---|---|---|
| 5,175,621 A | * | 12/1992 | Maesato | 358/164 |
| 5,481,317 A | * | 1/1996 | Hieda | 348/674 |
| 5,898,507 A | * | 4/1999 | Nakane et al. | 358/448 |
| 6,084,567 A | * | 7/2000 | Ogawa | 345/147 |
| 6,181,444 B1 | * | 1/2001 | Sato | 358/519 |
| 6,611,290 B1 | * | 8/2003 | Sato | 348/333.01 |

FOREIGN PATENT DOCUMENTS

| | | |
|---|---|---|
| JP | A1079956 | 3/1998 |
| JP | A2000184236 | 6/2000 |

* cited by examiner

*Primary Examiner*—Victor R. Kostak
(74) *Attorney, Agent, or Firm*—Birch, Stewart, Kolasch & Birch, LLP

(57) ABSTRACT

A gamma correction circuit has a data group generator which stores first to n-th gamma correction tables, receives first to n-th gains, and adjusts a level of the input signal using the first to n-th gamma correction tables and the first to n-th gains, thereby producing a gamma-corrected data group including first to n-th gamma-corrected data. The circuit also has a gamma characteristic controller which loads the first to n-th gains into the data group generator, a signal level discriminator which outputs a discrimination signal based on the level of the input signal, the first to n-th gamma correction tables, and the first to n-th gains, and an output selector which selects from among the first to n-th gamma-corrected data on the basis of a value of the discrimination signal, thereby producing the gamma-corrected output signal.

16 Claims, 7 Drawing Sheets

GAMMA CORRECTION CIRCUIT

BACKGROUND OF THE INVENTION

The present invention relates to a gamma correction circuit for correcting a digital video signal, which has been produced by A/D conversion, in accordance with a light-emitting characteristic of a display device.

In General, a relationship between amplitude of a video signal inputted into the display device and brightness of the displayed image is referred to as gamma characteristic. A television signal system such as an NTSC system is designed for a CRT-type display device. Therefore, if the display device is of LCD (liquid crystal display) type, a reverse gamma correction normally using a gamma value γ of 2.2 must be performed on a video signal that is to be inputted into the LCD device. In other words, since a gamma characteristic of an LCD is different from that of a CRT, both a reverse gamma correction using a gamma value of the CRT and a gamma correction using a gamma value of the LCD must be performed on the video signal that is to be inputted into the LCD device in order to improve the gradation expression in the LCD device. Furthermore, in a display device that is capable of adjusting the color temperature, which is defined by a ratio of intensities of RGB colors in a white image, in accordance with light-emitting characteristics of the RGB colors, user's preferences or other conditions, the gamma characteristics in the respective colors must be adjusted so as to avoid a change of the color temperature that may occur when the brightness of the displayed image varies.

A gamma correction circuit disclosed in the Japanese Patent Kokai Publication No. 10-79956 (date of publication: Mar. 24, 1998) and shown in FIG. 10 has a memory 41 that stores a plurality of different look-up tables in connection with the gamma correction data in order to enable the above-mentioned adjustment. In the gamma correction circuit, the controller 42 selects from among the look-up tables for the respective colors. The input signals R, G, B are converted into the gamma-corrected signals $R_γ$, $G_γ$, $B_γ$ of desired levels. The color correction circuit 43 converts the gamma-corrected signals $R_γ$, $G_γ$, $B_γ$ into color-corrected signals $R_c$, $G_c$, $B_c$, using predetermined conversion coefficients.

However, in the prior-art gamma correction circuit described above, a great number of different look-up tables must be loaded into the memory 41 in advance in accordance with the display types, user's preferences or other conditions. Since such gamma correction circuit needs a memory with extremely large capacity, it is difficult to make the gamma correction circuit at low cost.

SUMMARY OF THE INVENTION

It is an object of the present invention to provide a gamma correction circuit that can cause a video signal to acquire a desired gamma characteristic with a simple configuration.

According to the present invention, a gamma correction circuit for correcting an input signal to produce a gamma-corrected output signal, comprises a data group generator which stores first to n-th gamma correction tables, receives first to n-th gains, and adjusts a level of the input signal using the first to n-th gamma correction tables and the first to n-th gains, thereby producing a gamma-corrected data group including first to n-th gamma-corrected data, n being an integer not less than two; a gamma characteristic controller which loads the first to n-th gains into the data group generator; a signal level discriminator which outputs a discrimination signal based on a level of the input signal, the first to n-th gamma correction tables, and the first to n-th gains; and an output selector which selects from among the first to n-th gamma-corrected data on the basis of a value of the discrimination signal, thereby producing the gamma-corrected output signal.

According to another aspect of the present invention, a gamma correction circuit for correcting an input signal to produce an output signal, comprises a data group generator which stores first to n-th gamma correction tables, receives first to n-th gains, and adjusts a level of the input signal using the first to n-th gamma correction tables and the first to n-th gains, thereby producing a gamma-corrected data group including first to n-th gamma-corrected data, n being an integer not less than two; a gamma characteristic controller which inputs the first to n-th gains to the data group generator; a signal level discriminator which outputs a discrimination signal based on levels of the first to n-th gamma-corrected data; and an output selector which selects from among the first to n-th gamma-corrected data on the basis of a value of the discrimination signal, thereby producing the gamma-corrected output signal.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

First Embodiment

Figure 1:
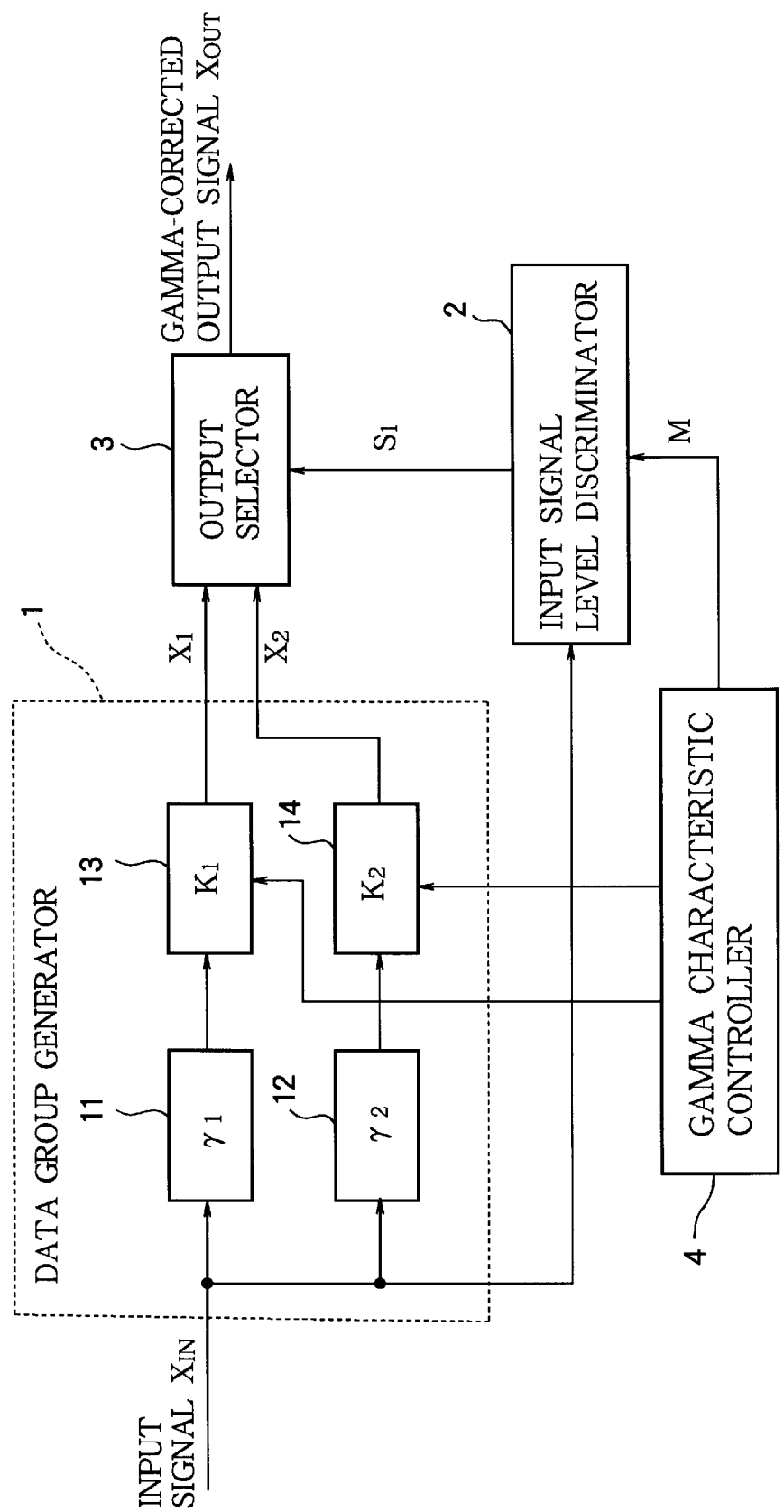
FIG. 1 is a block diagram showing a gamma correction circuit according to a first embodiment of the present invention.

FIG. 1 is a block diagram showing a gamma correction circuit according to a first embodiment of the present invention. As shown in FIG. 1, the gamma correction circuit according to the first embodiment has a data group generator 1 which produces a gamma-corrected data group including first to n-th gamma-corrected data (n is an integer not less than two), an input signal level discriminator 2, an output selector 3, and a gamma characteristic controller 4.

The data group generator 1 has a first memory 11 in which the first gamma correction table is stored and a second memory 12 in which the second gamma correction table is stored. The first memory 11 and the second memory 12 may be separate memory areas in the same semiconductor memory device or may be separate semiconductor memory devices. An input signal $X_{IN}$ as a digital video signal is inputted into both the first memory 11 and the second memory 12. Data corresponding to a level of the input signal $X_{IN}$ is selected from the first gamma correction table and is outputted from the first memory 11. Further, data corresponding to a level of the input signal $X_{IN}$ is selected from the second gamma correction table and is outputted from the second memory 12.

Furthermore, the data group generator 1 has a first gain adjustment section 13 into which a first gain $K_1$ is loaded and a second gain adjustment section 14 into which a second gain $K_2$ is loaded. The first gain adjustment section 13 corrects the data outputted from the first memory 11 using the first gain $K_1$, thereby producing first gamma-corrected data $X_1$. Further, the second gain adjustment section 14 corrects the data outputted from the second memory 12 using the second gain $K_2$, thereby producing second gamma-corrected data $X_2$.

The input signal level discriminator 2 outputs to the output selector 3 a signal $S_1$ that indicates the judgment result based on a level of the input signal $X_{IN}$ of the data group generator 1 and the first and second gains $K_1$ and $K_2$ outputted from the gamma characteristic controller 4. The details of the judgment will be described below.

The output selector 3 selects either the first gamma-corrected data $X_1$ or the second gamma-corrected data $X_2$ produced by the data group generator 1 on the basis of a value of the signal $S_1$ from the input signal level discriminator 2. The selected gamma-corrected data is outputted from the output selector 3 as a gamma-corrected output signal $X_{OUT}$. Then, the gamma-corrected output signal $X_{OUT}$ as a video signal is inputted into a display device such as an LCD panel and a plasma display panel.

The gamma characteristic controller 4 loads the first gain $K_1$ into the first gain adjustment section 13 and loads the second gain $K_2$ into the second gain adjustment section 14. The first gain $K_1$ and the second gain $K_2$ are determined on the basis of the light emitting characteristic of the display device, user's preferences or other conditions.

Figure 2:
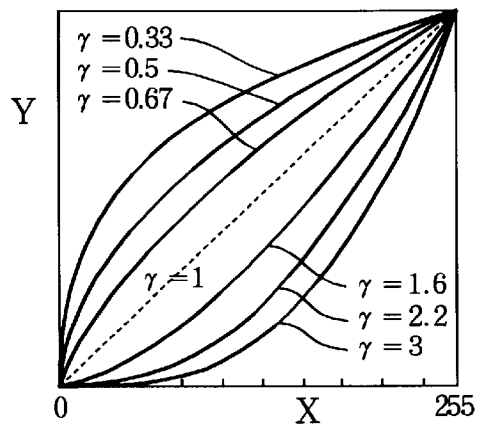
FIG. 2 shows curves corresponding to the gamma correction tables which are stored in the memories of the data group generator of FIG. 1.

FIG. 2 shows curves corresponding to the gamma correction tables which are stored in the memories of the data group generator of FIG. 1. The first gamma correction table stored in the first memory 11 is expressed by the gamma value $\gamma_1$, and the second gamma correction table stored in the second memory 12 is expressed by the gamma value $\gamma_2$. In FIG. 2, an ordinate X represents a level of the input signal $X_{IN}$, and an abscissa Y represents a level of the signal outputted from the first memory 11 or the second memory 12. When a gamma value is represented by $\gamma$, a variable Y representing the level of the output signal satisfies an expression $Y=X^\gamma$. In FIG. 2 are shown the curves corresponding to the gamma correction tables when $\gamma$ is 0.33, 0.5, 0.67, 1.0, 1.5, 2.2, and 3.0. By selecting two or more curves from among the plural gamma correction tables and combining them, an almost desired gamma characteristic can be obtained.

Figure 3:
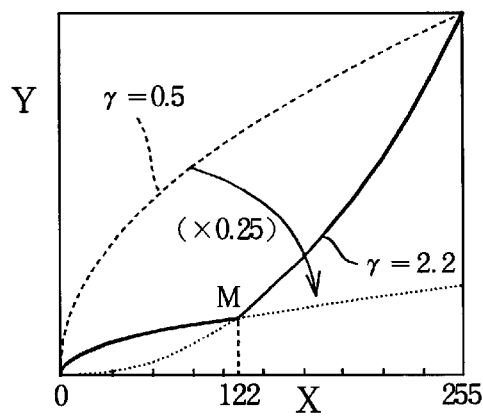
FIG. 3 shows a curve corresponding to the gamma correction data that is used in the gamma correction circuit of FIG. 1.

FIG. 3 shows a curve (solid line) corresponding to the gamma correction data (gamma characteristic) which is used in the gamma correction circuit of FIG. 1. The gamma characteristic shown in FIG. 3 is produced by combining two gamma characteristic curves, one of which corresponds to the gamma value $\gamma_1$ of 2.2 stored in the first memory 11, and the other of which corresponds to the gamma value $\gamma_2$ of 0.5 stored in the second memory 12. When the first gain $K_1$ of the first gain adjustment section 13 is 1.0 and the second gain $K_2$ of the second gain adjustment section 14 is 0.25, a first curve (a line including a broken line portion and a solid line portion) in connection with $\gamma_1$ of 2.2 remains unchanged and a curve (a broken line) in connection with $\gamma_2$ of 0.5 is changed to a second curve (a line including a solid line portion and a broken line portion) with a value of 0.25 times, as shown in FIG. 3. Assuming a reference point to be an intersection point M of the first curve representing the first gamma correction data and the second curve representing the second gamma correction data, the value of the discrimination signal $S_1$ changes between when the level of the input signal $X_{IN}$ is lower than a value of the reference point M and when the level of the input signal $X_{IN}$ is higher than the value of the reference point M. The output selector 3 outputs the signal $X_{OUT}$ corresponding to the data that has been corrected using the second gamma correction table and the second gain $K_2$ when the level of the input signal $X_{IN}$ is below the value of the reference point M. Further, the output selector 3 outputs the signal $X_{OUT}$ corresponding to the data that has been corrected using the first gamma correction table and the first gain $K_1$ when the level of the input signal $X_{IN}$ is above the value of the reference point M. In FIG. 3, the input level of the reference point M is 122/255. The gamma characteristic of the data group generator 1 is shown as a solid line in FIG. 3.

The gamma characteristic of the data group generator 1 indicated by the solid line in FIG. 3 is just one example. The gamma characteristic of the data group generator 1 can be changed by setting the values of the first and second gains $K_1$ and $K_2$ to appropriate values. In other words, the gamma characteristic of the data group generator 1 can be changed by combining the first and second curves that have been adjusted by the first and second gains $K_1$ and $K_2$. Therefore, the gamma correction circuit according to the first embodiment corrects the input signal appropriately, thereby producing the appropriate gamma-corrected output signal $X_{OUT}$.

Figure 4:
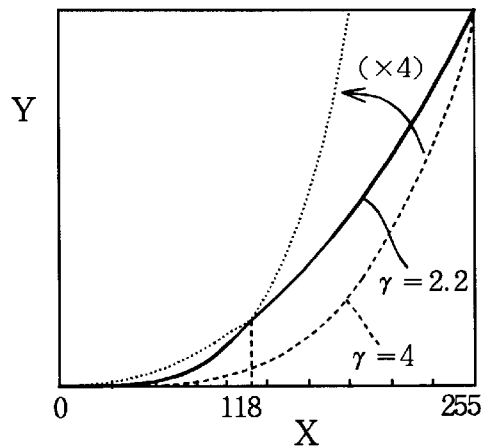
FIG. 4 shows another curve corresponding to the gamma correction data that is used in the gamma correction circuit of FIG. 1.

FIG. 4 shows a curve (solid line) corresponding to the gamma correction data (gamma characteristic) that is used in the gamma correction circuit of FIG. 1, which is provided with a black level expansion function. In FIG. 4, the gamma correction table corresponding to the gamma value $\gamma_1$ of 2.2 is stored in the first memory 11, and the gamma correction table corresponding to the gamma value $\gamma_2$ of 4 is stored in the second memory 12. Further, the first gain $K_1$ loaded into the first gain adjustment section 13 is 1.0, and the second gain $K_2$ loaded into the second gain adjustment section 14 is 4. Therefore, the input level of the reference point M is 118/255. The input signal discriminator 2 compares the value of the reference point M and the level of the input signal $X_{IN}$ and produces the signal $S_1$ in accordance with the result of the comparison. The gamma characteristic of the data group generator 1 indicated by the solid line in FIG. 4 can be changed by setting the values of the first and second gains $K_1$ and $K_2$ to appropriate values.

As described above, in the gamma correction circuit according to the first embodiment, the data group generator 1 produces the first and second gamma-corrected data $X_1$ and $X_2$ using the first and second gamma correction tables and the first and second gains $K_1$ and $K_2$, and the output selector 3 selects and outputs the gamma-corrected data $X_1$ or $X_2$ as the gamma-corrected output signal $X_{OUT}$. Therefore, the gamma correction circuit according to the first embodiment can produce an arbitrary output signal $X_{OUT}$. In other words, with simple configuration (a small number of gamma correction tables and gain adjustment sections) an appropriate gamma correction can be made in accordance with a characteristic of a display device, user's preferences or other conditions.

In the above-mentioned explanation, the data group generator 1 uses two gamma correction tables and two gains, but it may use three or more gamma correction tables and three or more gains in order to perform more appropriate gamma correction.

Second Embodiment

Figure 5:
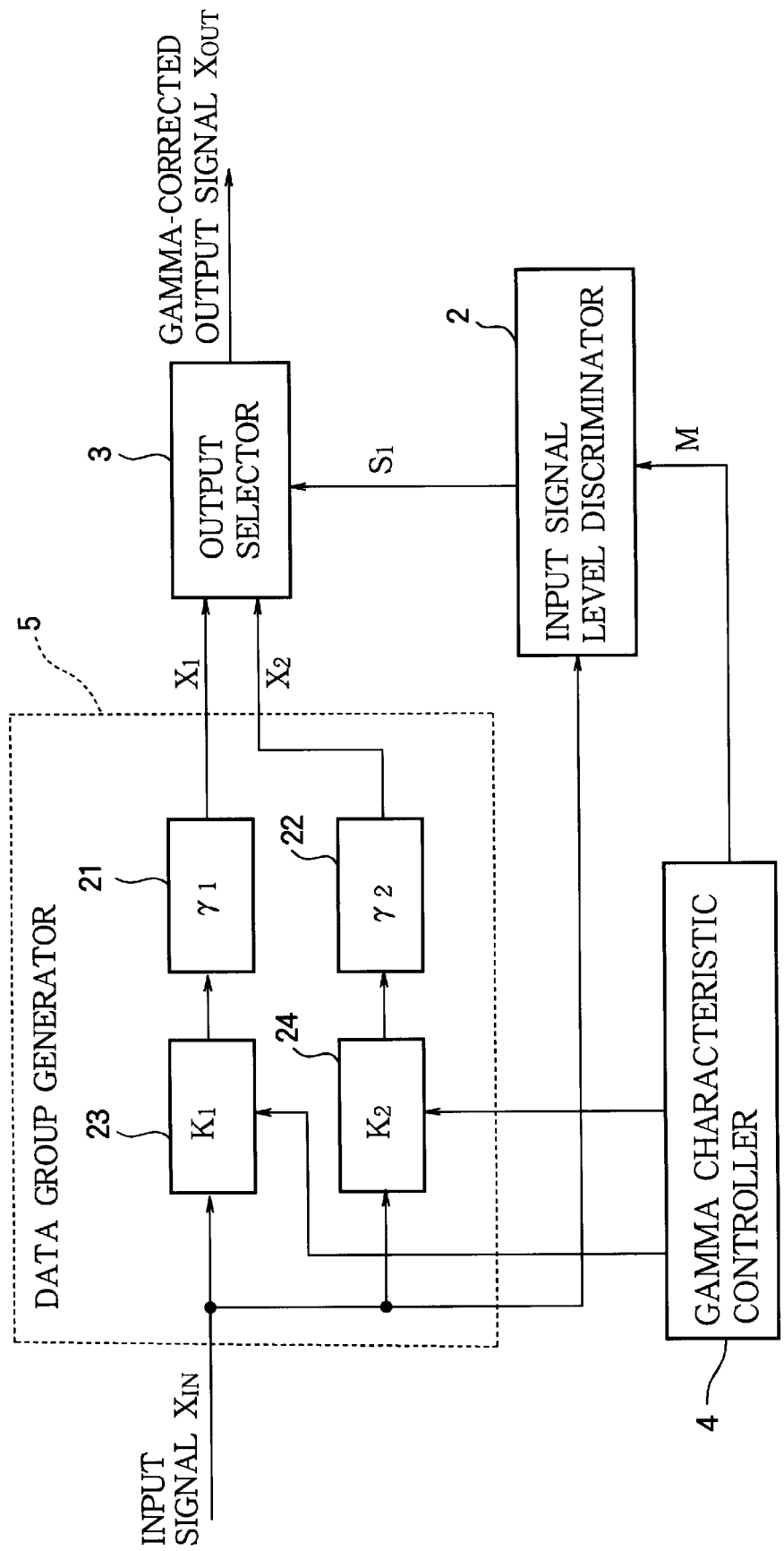
FIG. 5 is a block diagram showing a gamma correction circuit according to a second embodiment of the present invention.

FIG. 5 is a block diagram showing a gamma correction circuit according to a second embodiment of the present invention. In the above-described first embodiment, the first gain adjustment section 13 and the second gain adjustment section 14 are respectively disposed in a downstream of the first memory 11 and the second memory 12, but in the second embodiment, these orders are reversed.

In the gamma correction circuit according to the second embodiment, the data group generator 5 adjusts the level of the input signal $X_{IN}$ using the first and second gains $K_1$ and $K_2$ loaded into the first and second gain adjustment sections 23 and 24, and subsequently adjusts them using the gamma correction tables stored in the first and second memories 21 and 22. In a similar manner to the first embodiment, in the gamma correction circuit according to the second embodiment, an almost desired gamma characteristic can be obtained by adjusting the first gain $K_1$ and the second gain $K_2$ by the gamma characteristic controller 4.

In General, in a gamma correction table, the number of the output bit (10–12 bits) is larger than that of the input bit (8–10 bits). This is because the resolving power of the human eye in a black level is superior to that in a white level. According to the gamma correction circuit of this embodiment, since the gain adjustment sections (i.e., multipliers) can be disposed in an upstream of the gamma correction tables, increase of the circuit scale of the gamma correction circuit can be prevented.

Third Embodiment

Figure 6:
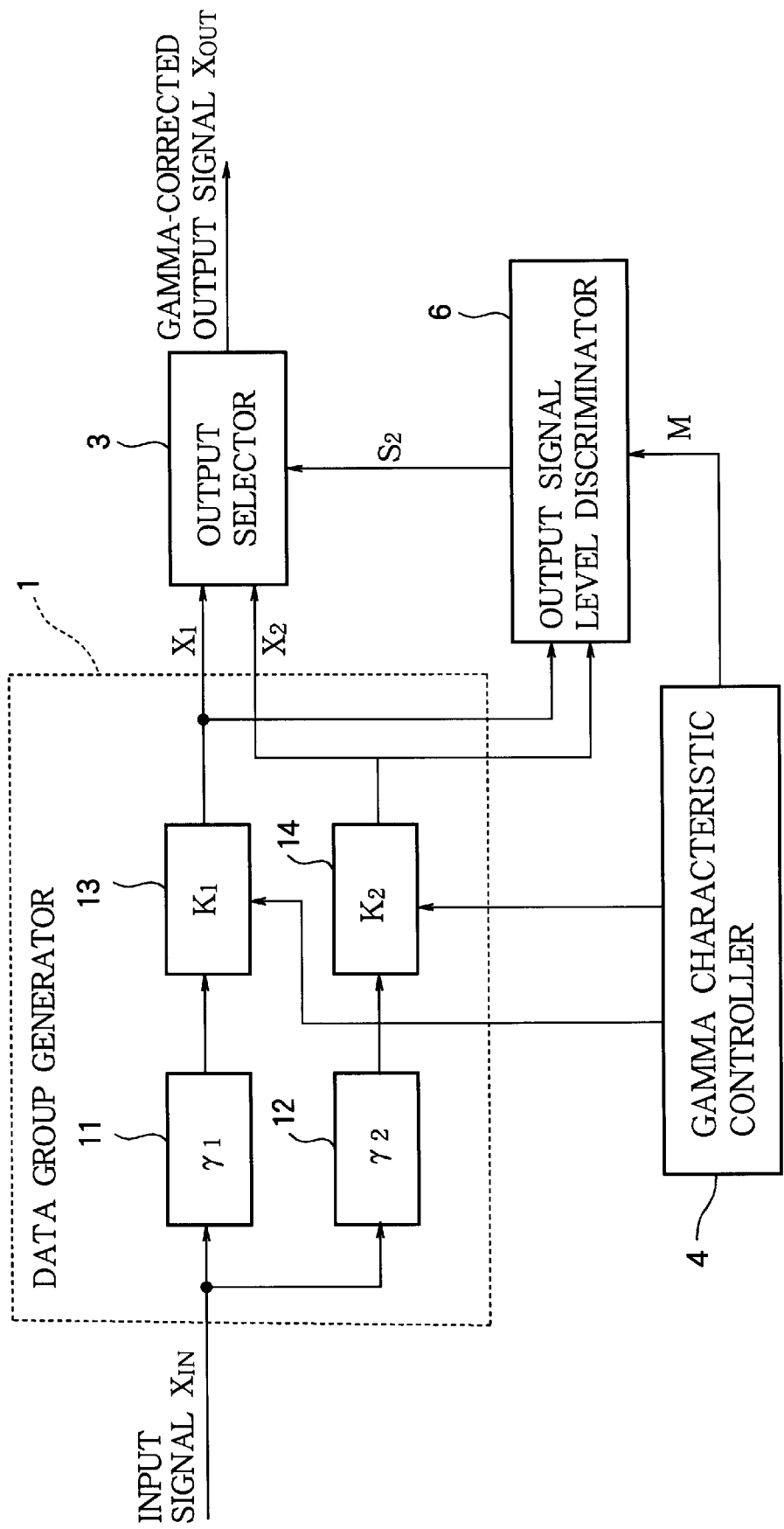
FIG. 6 is a block diagram showing a gamma correction circuit according to a third embodiment of the present invention.

FIG. 6 is a block diagram showing a gamma correction circuit according to a third embodiment of the present invention. As shown in FIG. 6, the gamma correction circuit according to the third embodiment is different from that according to the first embodiment in the respect that an output signal level discriminator 6 is provided in place of the input signal level discriminator 2 of FIG. 1.

The output signal level discriminator 6 compares the outputs of the first gain adjustment section 13 and the second gain adjustment section 14, and outputs a discrimination signal $S_2$ based on the comparison result. The output selector 3 switches the output on the basis of the discrimination signal $S_2$ outputted from the output signal level discriminator 6. For example, the first gamma correction table stored in the first memory 13 is expressed by a gamma value $\gamma_1$ of 2.2 and the second gamma correction table stored in the second memory 14 is expressed by a gamma value $\gamma_2$ of 4, the output signal level discriminator 6 compares the first gamma-corrected data $X_1$ outputted from the first gain adjustment section 13 and the second gamma-corrected data $X_2$ outputted from the second gain adjustment section 14, the output selector 3 switches the output $X_{OUT}$ as follows based on the comparison result.

$X_{OUT}=X_1$ (at $X_1<X_2$)

$X_{OUT}=X_2$ (at $X_1>X_2$)

Further, except for the above-described points, the third embodiment is the same as the first or second embodiment. Furthermore, the data group generator 1 according to the third embodiment may be replaced with the data group generator 5 according to the second embodiment.

Fourth Embodiment

Figure 7:
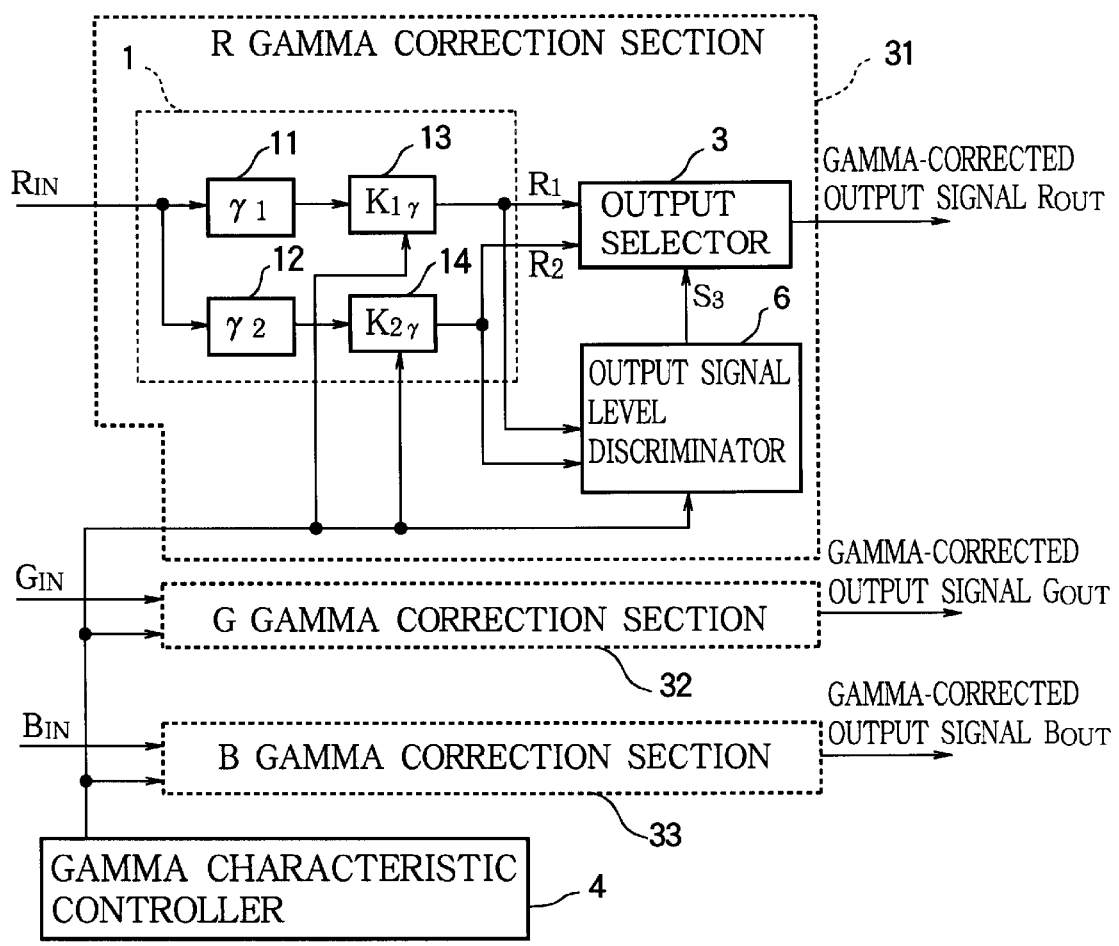
FIG. 7 is a block diagram showing a gamma correction circuit according to a fourth embodiment of the present invention.
Figure 8:
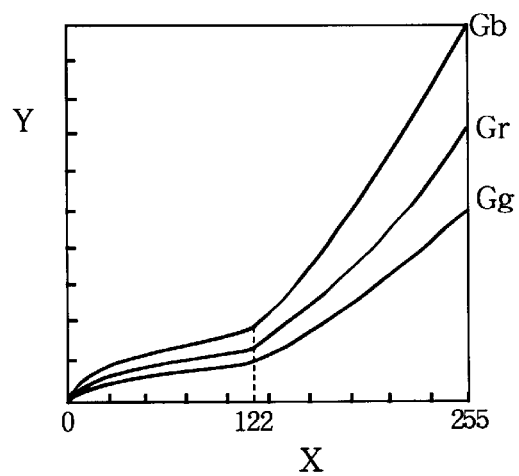
FIG. 8 shows curves corresponding to the gamma correction data for RGB colors that are used in the gamma correction circuit of FIG. 7.

FIG. 7 is a block diagram showing a gamma correction circuit including three gamma correction sections according to a fourth embodiment of the present invention. Further, FIG. 8 shows curves corresponding to the gamma correction data for RGB colors which are used in the gamma correction circuit of FIG. 7.

As shown in FIG. 7, the gamma correction circuit according to the fourth embodiment has a first gamma correction section (R-gamma correction section) 31 for gamma-correcting an input signal $R_{IN}$ for red color, a second gamma correction section (G-gamma correction section) 32 for gamma-correcting an input signal $G_{IN}$ for green color, and a third gamma correction section (B-gamma correction section) 33 for gamma-correcting an input signal $B_{IN}$ for blue color. Each of the gamma correction sections 31 to 33 has a structure similar to the gamma correction circuit of the first, second or third embodiment. However, each of the gamma correction sections 31 to 33 does not have a gamma characteristic controller. As shown in FIG. 7, the gamma correction circuit according to the fourth embodiment has only one gamma characteristic controller 4 that can supply the gain data to each of the gamma correction sections 31 to 33.

The gamma correction circuit according to the fourth embodiment adjusts the color temperature as follows. Assuming $G_r$, $G_g$, $G_b$ to be output amplitudes of the respective colors R, G, B in a desired color temperature (maximum white output), the following adjustment is performed in order to provide a uniform color temperature in the entire grayscales and an appropriate gamma characteristics. The first memory 11 of the respective R-, G-, and B-gamma correction sections 31, 32, and 33 stores the same gamma correction tables. Further, the second memory 12 of the respective R-, G-, and B-gamma correction sections 31, 32, and 33 stores the same gamma correction tables. Furthermore, the first and second gains of the R-gamma correction section 31 are $K_{1r}$ and $K_{2r}$, the first and second gains of the G-gamma correction section 32 are $K_{1g}$ and $K_{2g}$, and the first and second gains of the B-gamma correction section 33 are $K_{1b}$ and $K_{2b}$. The gamma correction circuit according to the fourth embodiment is controlled so as to satisfy $G_r:G_g:G_b=K_{1r}:K_{1g}:K_{1b}=K_{2r}:K_{2g}:K_{2b}$. In this time, the ratio among $G_r$, $G_g$, and $G_b$ is maintained constant despite the input signal level. FIG. 8 shows gamma characteristics of the gamma-corrected signals for RGB colors outputted from the R-, G-, and B-gamma correction sections of FIG. 7.

Fifth Embodiment

Figure 9:
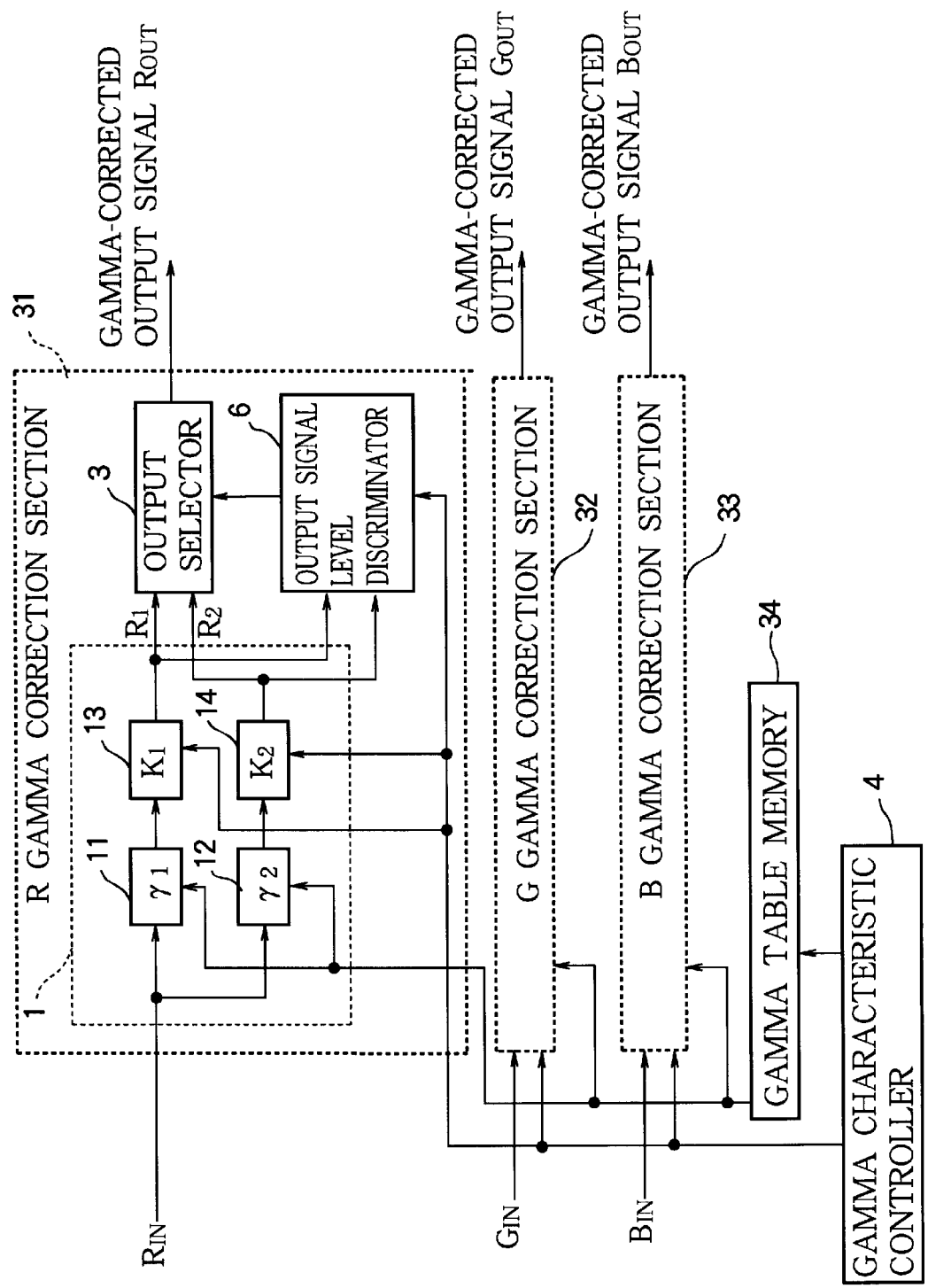
FIG. 9 is a block diagram showing a gamma correction circuit according to a fifth embodiment of the present invention.
Figure 10:
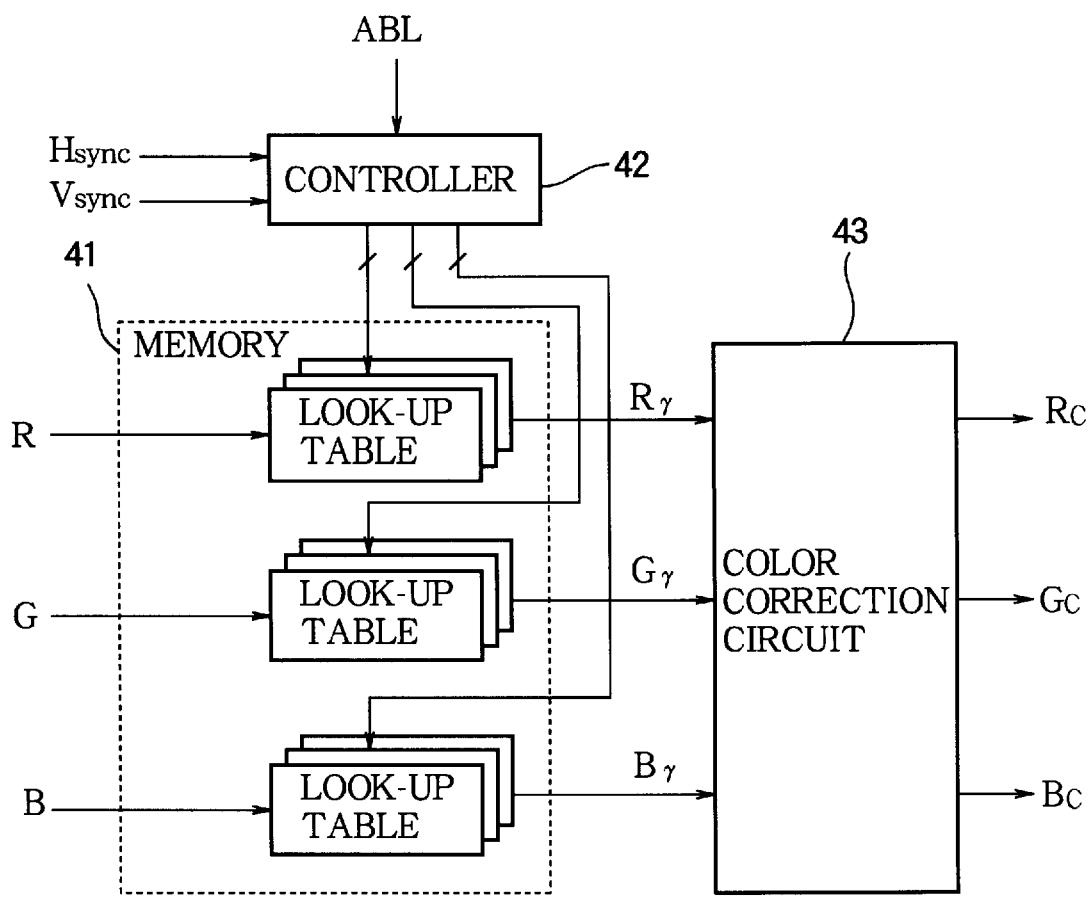
FIG. 10 is a block diagram showing a prior-art gamma correction circuit.

FIG. 9 is a block diagram showing a gamma correction circuit including three gamma correction sections according to a fifth embodiment of the present invention. The gamma correction circuit according to the fifth embodiment has a gamma table memory 34 as an external memory which stores other gamma correction tables. The gamma correction tables stored in the first memory 11 and the second memory 12 can be replaced with those stored in the gamma table memory 34. The gamma table memory 34 is a non-volatile memory, for instance. In the fifth embodiment, the first memory 11 and the second memory 12 in each of the R-gamma correction section 31, the G-gamma correction section 32, and the B-gamma correction section 33 have an appropriate capacity and are of rewritable-type. In the gamma correction circuit according to the fifth embodiment, since the gamma correction tables can be down-loaded from the gamma table memory 34 into the first memory 11 and the second memory 12 in case of necessity, the gamma correction tables in the first memory 31 and the second memory 12 are easily renewed and memory capacities of the first memory 11 and the second memory 12 can be minimized. Further, except for the above-described respects, the fifth embodiment is the same as the first, second, third or fourth embodiment. Furthermore, the external memory device can be provided in the gamma correction circuit according to any of the above-described embodiments.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. A gamma correction circuit for correcting an input signal to produce a gamma-corrected output signal, comprising:
    a data group generator which stores first to n-th gamma correction tables, receives first to n-th gains, and adjusts a level of the input signal using the first to n-th gamma correction tables and the first to n-th gains, thereby producing a gamma-corrected data group including first to n-th gamma-corrected data, n being an integer not less than two;
    a gamma characteristic controller which loads the first to n-th gains into said data group generator;
    a signal level discriminator which outputs a discrimination signal based on the level of the input signal, the first to n-th gamma correction tables, and the first to n-th gains; and
    an output selector which selects from among the first to n-th gamma-corrected data on the basis of a value of the discrimination signal, thereby producing the gamma-corrected output signal.

2. The gamma correction circuit according to claim 1, wherein, assuming a reference point to be an intersection point of a first curve representing an i-th gamma-corrected data and a second curve representing an (i+1)-th gamma-corrected data, i being a positive integer not more than n−1, on the coordinates having an ordinate representing the level of the input signal and an abscissa representing levels of the first to n-th gamma-corrected data, the value of the discrimination signal changes between when the level of the input signal is lower than a value of the reference point and when the level of the input signal is higher than the value of the reference point.

3. The gamma correction circuit according to claim 1, wherein, when the level X of the input signal is converted into levels $Y_1$ to $Y_n$ using the first to n-th gamma correction tables, a condition $Y_j = X^{\gamma j}$ is satisfied where j is a positive integer not more than n, and $\gamma_j$ is a gamma value which corresponds to the j-th gamma correction table.

4. The gamma correction circuit according to claim 1, wherein the adjustment by said data group generator is performed by adjusting the level of the input signal using the first to n-th gamma correction tables and subsequently adjusting the level of the input signal using the first to n-th gains.

5. The gamma correction circuit according to claim 1, wherein the adjustment by said data group generator is performed by adjusting the level of the input signal using the first to n-th gains and subsequently adjusting the level of the input signal using the first to n-th gamma correction tables.

6. The gamma correction circuit according to claim 1, wherein said gamma characteristic controller determines the first to n-th gains to be loaded into said data group generator on the basis of a characteristic of a display device, into which the gamma-corrected output signal is inputted.

7. The gamma correction circuit according to claim 1, further comprising an external memory device which stores other gamma correction tables;
    wherein the first to n-th gamma correction tables stored in said data group generator are capable of being replaced with the gamma correction tables stored in said external memory device.

8. A gamma correction circuit for correcting an input signal to produce a gamma-corrected output signal, comprising:
    a data group generator which stores first to n-th gamma correction tables, receives first to n-th gains, and adjusts a level of the input signal using the first to n-th gamma correction tables and the first to n-th gains, thereby producing a gamma-corrected data group including first to n-th gamma-corrected data, n being an integer not less than two;
    a gamma characteristic controller which loads the first to n-th gains into said data group generator;
    a signal level discriminator which outputs a discrimination signal based on levels of the first to n-th gamma-corrected data; and
    an output selector which selects from among the first to n-th gamma-corrected data on the basis of a value of the discrimination signal, thereby producing the gamma-corrected output signal.

9. The gamma correction circuit according to claim 8, wherein said signal level discriminator compares a level $L_k$ of the k-th gamma-corrected data and a level $L_{k+1}$ of the (k+1)-th gamma-corrected data, and the value of the discrimination signal changes between when the level $L_k$ is lower than the level $L_{k+1}$ and when the level $L_k$ is higher than the level $L_{k+1}$, k being a positive integer not more than n−1.

10. The gamma correction circuit according to claim 8, wherein, when the level X of the input signal is converted into levels $Y_1$ to $Y_n$ using the first to n-th gamma correction tables, a condition $Y_j = X^{\gamma j}$ is satisfied where j is a positive integer not more than n, and $\gamma_j$ is a gamma value which corresponds to the j-th gamma correction table.

11. The gamma correction circuit according to claim 8, wherein the adjustment by said data group generator is performed by adjusting the level of the input signal using the first to n-th gamma correction tables and subsequently adjusting the level of the input signal using the first to n-th gains.

12. The gamma correction circuit according to claim 8, wherein the adjustment by said data group generator is performed by adjusting the level of the input signal using the first to n-th gains and subsequently adjusting the level of the input signal using the first to n-th gamma correction tables.

13. The gamma correction circuit according to claim 8, wherein said gamma characteristic controller determines the first to n-th gains to be loaded into said data group generator on the basis of a characteristic of a display device, into which the gamma-corrected output signal is inputted.

14. The gamma correction circuit according to claim 8, further comprising an external memory device which stores other gamma correction tables;

wherein the first to n-th gamma correction tables stored in said data group generator are capable of being replaced with the gamma correction tables stored in said external memory device.

15. A gamma correction circuit for correcting input signals for first to third colors to produce gamma-corrected output signals, comprising:

a first gamma correction section which performs gamma correction on the input signal for the first color;

a second gamma correction section which performs gamma correction on the input signal for the second color;

a third gamma correction section which performs gamma correction on the input signal for the third color; and a gamma characteristic controller which stores first to n-th gains for said first to third gamma correction sections;

wherein each of said first to third gamma correction sections comprises:

a data group generator which stores first to n-th gamma correction tables, receives first to n-th gains, and adjusts a level of the input signal using the first to n-th gamma correction tables and the first to n-th gains, thereby producing a gamma-corrected data group including first to n-th gamma-corrected data, n being an integer not less than two, the first to n-th gains being supplied from said gamma characteristic controller to said data group generator;

a signal level discriminator which outputs a discrimination signal based on the level of the input signal, the first to n-th gamma correction tables, and the first to n-th gains; and an output selector which selects from among the first to n-th gamma-corrected data on the basis of a value of the discrimination signal, thereby producing the gamma-corrected output signal.

16. A gamma correction circuit for correcting input signals for first to third colors to produce gamma-corrected output signals, comprising:

a first gamma correction section which performs gamma correction on the input signal for the first color;

a second gamma correction section which performs gamma correction on the input signal for the second color;

a third gamma correction section which performs gamma correction on the input signal for the third color; and a gamma characteristic controller which stores first to n-th gains for said first to third gamma correction sections;

wherein each of said first to third gamma correction sections comprises:

a data group generator which stores first to n-th gamma correction tables, receives first to n-th gains, and adjusts a level of the input signal using the first to n-th gamma correction tables and the first to n-th gains, thereby producing a gamma-corrected data group including first to n-th gamma-corrected data, n being an integer not less than two, the first to n-th gains being supplied from said gamma characteristic controller to said data group generator;

a signal level discriminator which outputs a discrimination signal based on levels of the first to n-th gamma-corrected data; and an output selector which selects from among the first to n-th gamma-corrected data on the basis of a value of the discrimination signal, thereby producing the gamma-corrected output signal.

* * * * *